May 19, 1925. Re. 16,073

A. H. SMITH

COMPARTMENT FREIGHT CAR

Original Filed June 9, 1920 5 Sheets-Sheet 1

Inventor:
Alfred H. Smith
By Edwin S. Clarkson

May 19, 1925. Re. 16,073

A. H. SMITH

COMPARTMENT FREIGHT CAR

Original Filed June 9, 1920 5 Sheets-Sheet 2

Inventor
Alfred H. Smith
By Edwin S. Clausen

May 19, 1925. Re. 16,073

A. H. SMITH

COMPARTMENT FREIGHT CAR

Original Filed June 9, 1920 5 Sheets-Sheet 3

Inventor.
Alfred H. Smith
By Edwin S. Clarkson

May 19, 1925. Re. 16,073

A. H. SMITH

COMPARTMENT FREIGHT CAR

Original Filed June 9, 1920 5 Sheets-Sheet 4

Inventor
Alfred H. Smith
By Irwin S. Clarkson

May 19, 1925. Re. 16,073
A. H. SMITH
COMPARTMENT FREIGHT CAR
Original Filed June 9, 1920 5 Sheets-Sheet 5
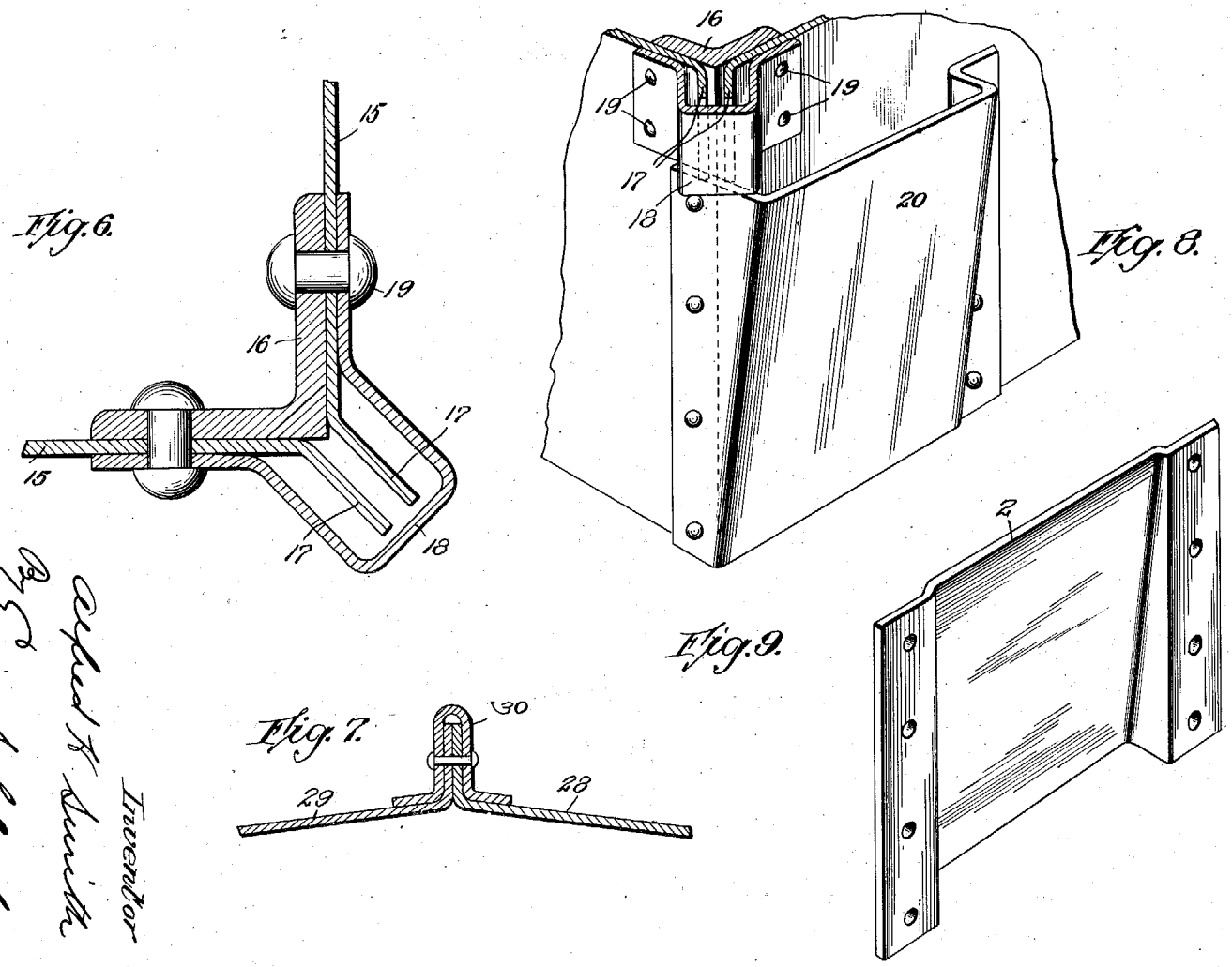
Inventor
Alfred H. Smith
By Edwin S. Clarkson Reissued May 19, 1925. Re. 16,073

UNITED STATES PATENT OFFICE.

ALFRED H. SMITH, OF NEW YORK, N. Y.

COMPARTMENT FREIGHT CAR.

Original No. 1,407,593, dated February 21, 1922, Serial No. 387,517, filed June 9, 1920. Application for reissue filed February 21, 1924. Serial No. 694,438.

*To all whom it may concern:*

Be it known that I, ALFRED H. SMITH, a citizen of the United States, residing at New York city, in the State of New York, have invented certain new and useful Improvements in Compartment Freight Cars, of which the following is a specification.

In the system now in vogue in handling freight and express matter it is necessary for the shipper, in many instances, to crate his goods then haul them to the station to a receiving platform from whence it is loaded onto the car and this series of operations is repeated after the goods reach the destination city. In the case of a shipment of merchandise, etc., the manufacturer must construct packing cases which involves a material expense.

In the billing of less than carload lots of merchandise for shipment, each box and package must be itemized and counted. By this invention, the lading would be placed in the compartment at shipper's load and count, would be sealed and locked and the compartment would be handled intact; the "way billing" will be reduced to a minimum; the reciting in detail of what the compartment contains will be eliminated. On some railroads, 80% of the billing is composed of these small items, and the checking of such takes time, involves expense and involves a great amount of labor.

As regards the burglary of cars and the loss and damage of freight: This mostly occurs between the time when the shipment is delivered to the freight house at the point of origin and the time it is delivered to the freight house at destination, for the reason that the average shipment passes through a large number of hands, is liable to breakage and gives opportunity for removing a portion of the merchandise.

In many instances cars are broken into while standing in yards and also while the trains are in motion, the packages being thrown out along the road and removed by confederates.

A great deal of damage also occurs by reason of rough handling in freight houses by careless employees or because the container is of insufficient strength. Also the constant re-handling of packages is responsible for breakage or partly destroyed goods.

It should also be taken into account that in addition to the actual loss and damage, there is a considerable loss to the public by reason of the fact that what they have purchased and shipped fails to arrive, or upon arrival, is in a damaged condition. This delays sales, and, in the case of castings and similar building material, delays construction, results in great inconvenience and loss of money so that the actual loss and damage, while it can be measured in terms of money, cannot be measured as to actual loss because of its importance at a given time. Furthermore with this invention shipments will not be so much exposed to the elements.

Reports show that loss and damage on L. C. L. (less than car lots) on one railroad for six months ending February 29th, 1920, was $2,161,680. A study shows that 11% of freight revenue is derived from L. C. L. freight. On this basis during the six months this traffic produced $10,239,682 revenues on said railroad. The losses shown, therefore, bear a ratio of 21 per cent to the amount received for carrying the freight. Practically 80% of the "billing" is due to L. C. L. freight. The elimination of this alone is a very material item.

Under the present rate of wage scale the handlings of the individual packing cases from dray to platform and from platform to car, from car to platform and from platform to dray is a very large item of expense in the handling of express and freight matter.

One of the objects of my invention is to provide individual freight or merchandise compartment to shippers at the factory or stores into which their goods may be placed without being previously crated and the compartments loaded and placed upon a dray from which it is lifted onto a car or platform at the railroad station there being a plurality of these compartments for each car so that the individual compartment may be lifted bodily with its contents from the car at the point of its destination and placed upon a truck to be delivered to the consignee at the store or factory who will unpack the compartment and have it returned to the railroad. By this system it will be seen that a number of handlings of freight merchandise, parcel post and express matter is eliminated thereby cutting down the cost besides which the lading is thoroughly protected from the inclemencies of the weather while in transit and thoroughly protected against theft.

Another object of this invention is to place a plurality of these compartments on a single car, in juxtaposition, with the door of one compartment facing a wall of the next adjacent compartment or an abutment whereby the doors are held in closed position while en route. The doors being adjacent the walls of the next compartment cannot be opened while the compartments are in transit on the railroad.

Another object of my invention is to provide means whereby these compartments may be anchored and stabilized on the car against accidental displacement and to provide the compartments with suitable devices to which the chain of a crane may be attached whereby the compartments may be promptly lifted from the car by a crane and deposited on a delivery truck or platform.

Another object of my invention is to provide each compartment with compression members to prevent the buckling, twisting or distorting under the strain of the load in the act of lifting them by a crane from the car to the truck or platform.

Another object of my invention is to so construct each compartment that it will be braced to withstand the weaving of the car under service conditions.

With these and other objects in view my invention consists of the parts, and combination of parts, as will be hereinafter more fully set forth.

In the drawing:

Figure 3 is a transverse section of a car showing a compartment in position on it, the compartment being partially broken away to show the friction wedge lock between the car and compartment.

Figure 6 is an enlarged detail view on line 6—6 Figure 3 of the corner joint and reinforcement of a compartment.

Figure 7 is an enlarged detail sectional view through one of the roof sheet joints.

Figure 8 is an enlarged detail perspective view of one of the lower corners of a compartment.

Figure 9 is an enlarged detail rear perspective view of a wedge lock element detached from the car.

Figure 1:
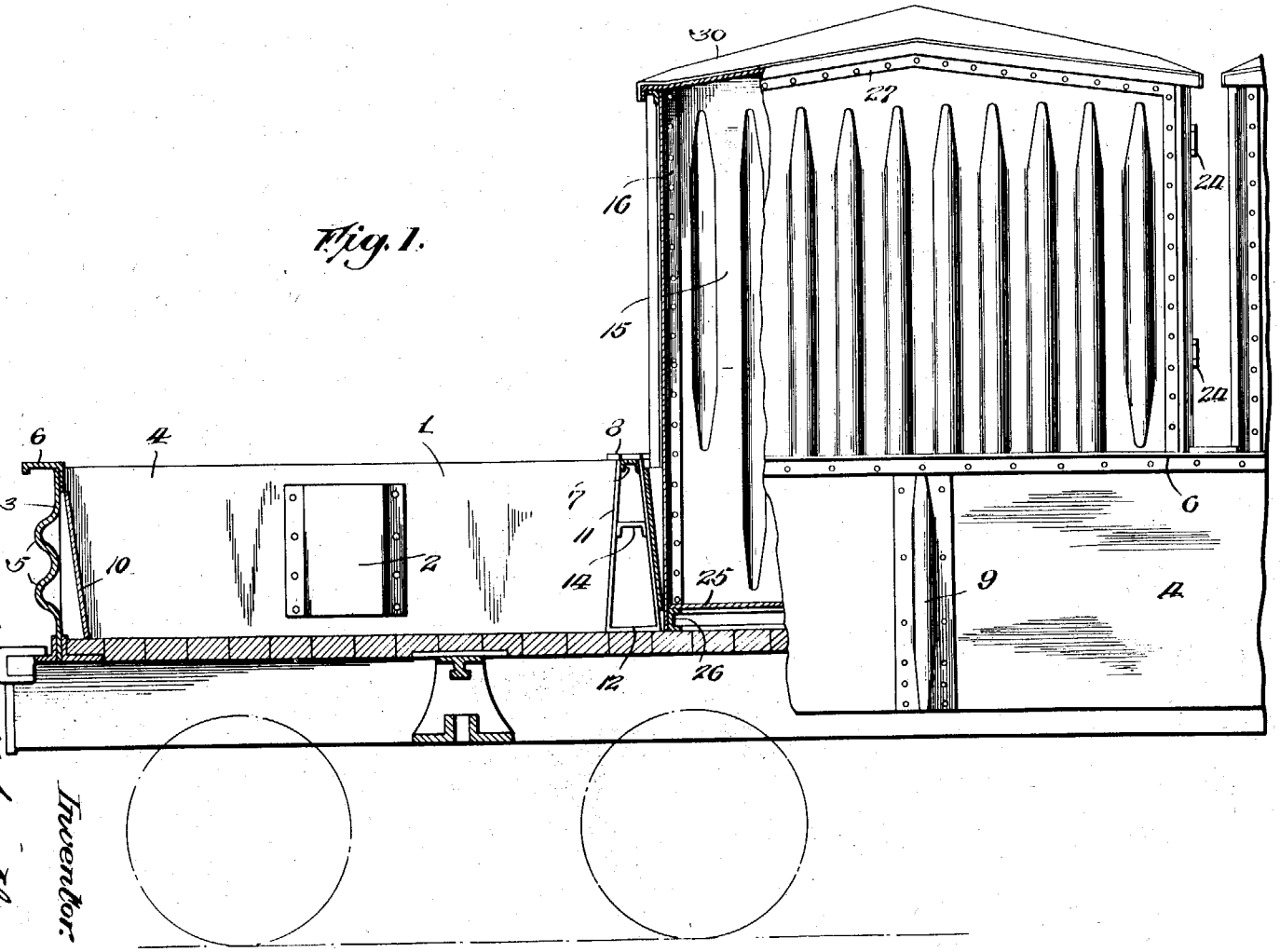
Figure 1 is a detailed side elevation and vertical longitudinal section of a car and compartment embodying my invention.
Figure 2:
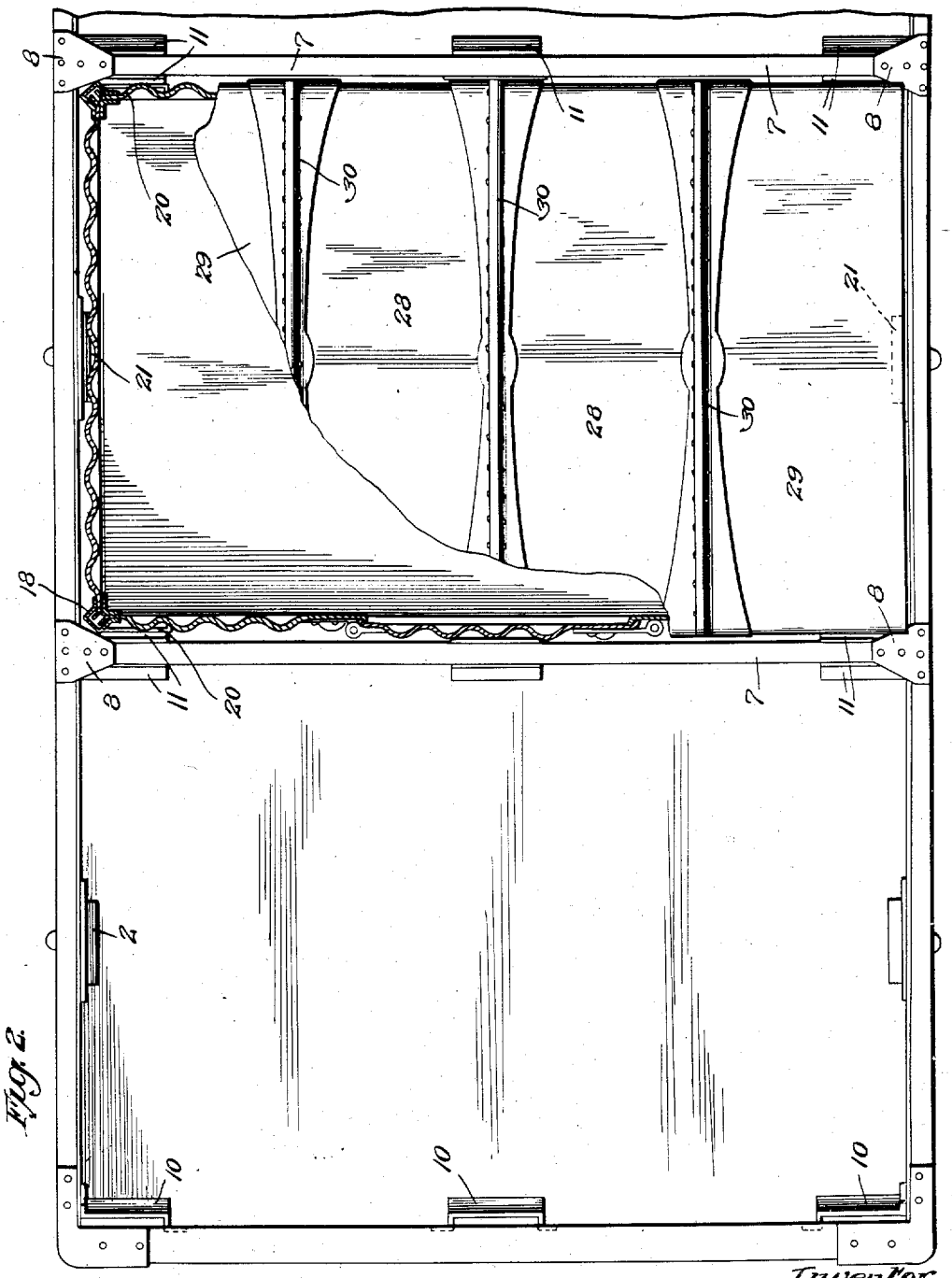
Figure 2 is a top plan view of Figure 1, the compartment being partly in section.
Figure 5:
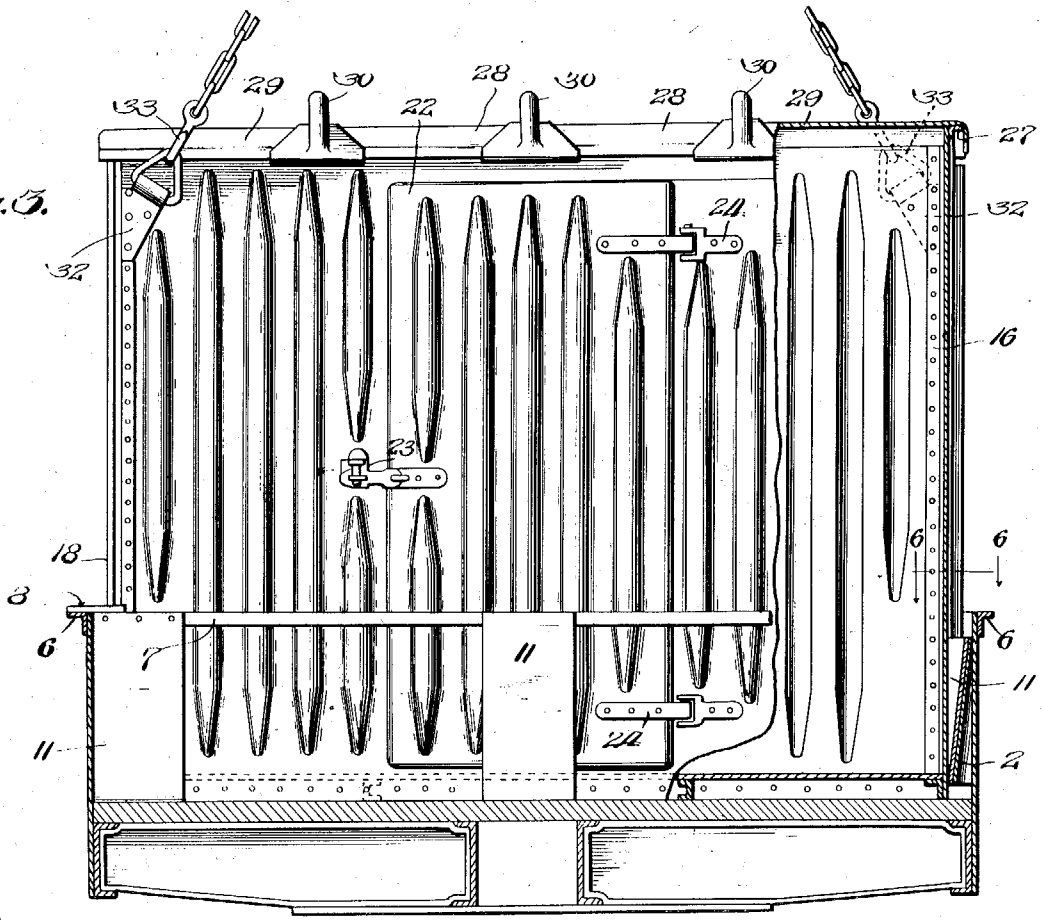
Figure 5 is a group view of doors in section showing varied types of weather proofing joints between the doors and compartments.
Figure 5:
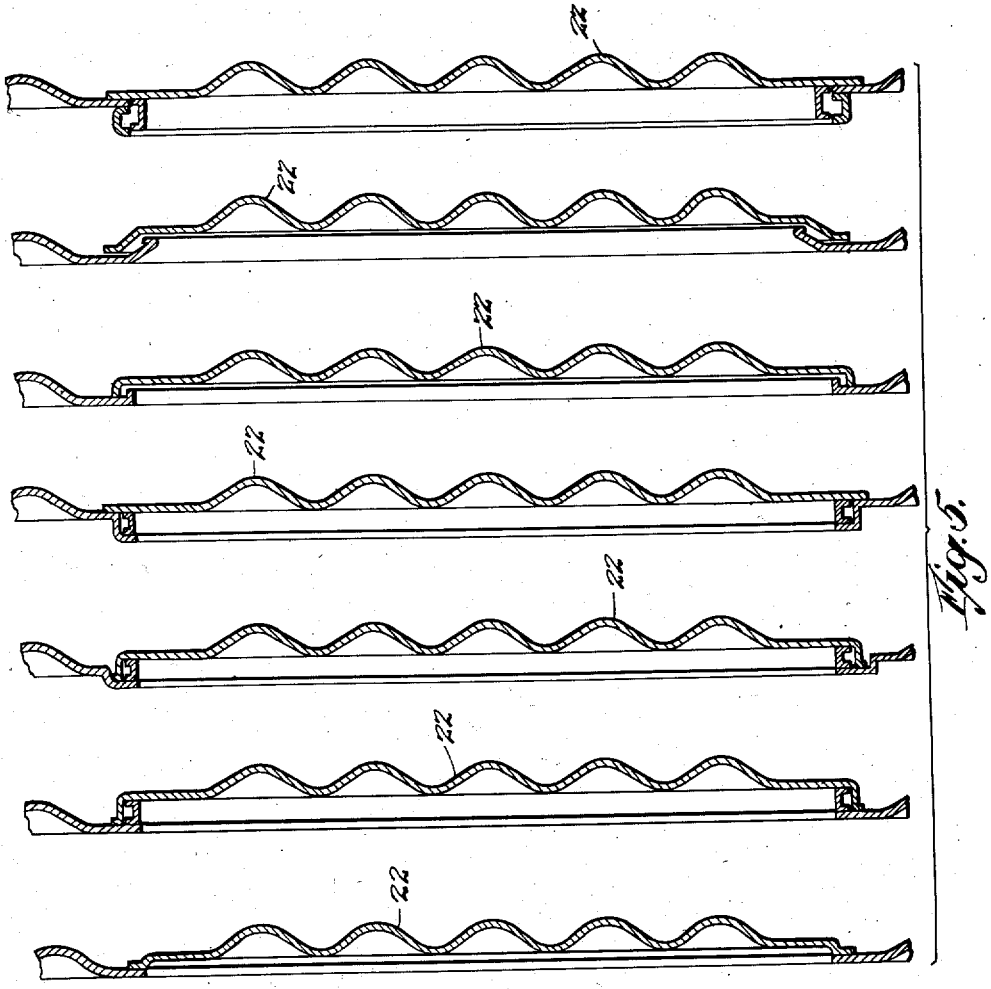
Figure 4:
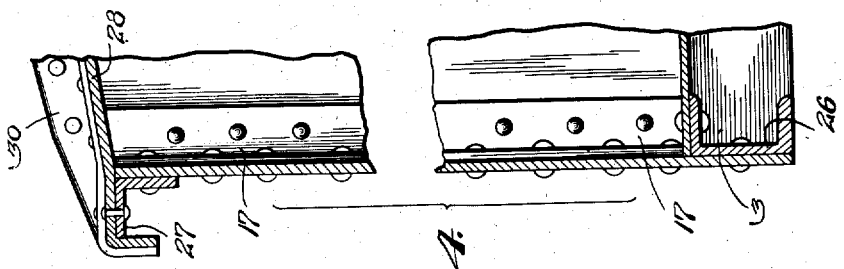
Figure 4 is a detail vertical section of the compartment.

The reference numeral 1 designates a gondola car which may be of any desired or standard construction. In the present instance I have shown the end, 3, and side walls 4, of the car constructed of sheet metal, the end walls being provided with longitudinally extending corrugations, 5, which corrugations function as beams thereby materially strengthening the end walls against thrust. The upper edge of the end and side walls is reinforced by the angle iron 6.

In the present instance the interior of the body of the car is divided into a series of spaces by means of transverse members, 7, each end of which is connected to the angle iron, 6, by the means of the gusset 8, as clearly shown in the drawings.

2 is a wedge element riveted to the inner face of the side walls of the car, the wedge face being inclined downwardly and inwardly from the inner face of the side wall of the car. These wedge elements are, preferably, located at a point in the car diametrically opposite the outside car stake 9, whereby the stake reinforces and supports the wedge element and side wall of the car against bulging outwardly.

Similar wedge elements are secured to the opposite walls of the car.

Wedge elements, 10, are secured to the end walls of the car, as shown in the drawing, and these elements are of the same construction as the wedge element 2. Wedge elements 11 are secured to the transverse member 7 and consist of a substantially U-shaped member 12 with its arms converging toward each other at the top whereby inclined wedges are formed along the same angle and pitch as the wedge elements 2. The arms of the wedge member 11 are secured to a channel iron compression member 14. From this it will be seen that there are shown in the present embodiment eight wedge members for each space on the car.

The stakes 9 are each provided with a longitudinally extending corrugation which functions as a beam to support the side walls of the car against bulging outwardly.

As stated the car is divided into a plurality of spaces, the number being dependent upon the length of the car, said spaces being designed to receive and retain against accidental displacement, a plurality of individual freight, merchandise, or parcel post compartments.

Inasmuch as all of the compartments are of the same construction it will be necessary only to describe one of them. The compartments are preferably constructed of sheet metal, the walls of the compartments may be provided with corrugations extending vertically of the compartments, or the walls may be of flat sheet metal.

These corrugations function as beams for the side walls whereby said walls may be constructed of comparatively thin metal without impairing the strength of the wall and the ability of the walls to withstand the shocks, strains and stresses incidental to service conditions while the compartment is in transit on a car.

The side walls of the compartment are secured at the corners to an angle bar 16, the extreme end portions of the side sheets being extended beyond the corner and deflected outward at 17 so as to lie parallel. A corner cap, 18, substantially U-shaped in cross section is fitted on the extended ends 17 of the side walls and secured by means of rivets 19 to the side wall of the compartment and angle iron 16 so that the rivets are common to the side wall, angle iron 16, and U-shaped cap 18. This corner formation very materially strengthens the corner joints of the compartment against twisting and other strains so that the compartment will remain "in square" under all service conditions. In addition to the function of strengthening the corners of the compartment the U-shaped corner cap 18, also functions to make a weather and dust proof joint in the corner of the compartment. This U-shaped cap 18 and extended portions 17 of the side wall terminate at a point above the bottom of the compartment as shown in the drawing. At each corner of the compartment I secure a wedge element 20 which extends from the termination of the lower end of the corner cap 18 to a point in the plane of the floor of the compartment which wedge elements engage and co-act with the wedge elements 10, and 11 when the compartment is lowered into position on the car thereby centering and locking the compartment in its proper position on the car.

On each side and one end wall of the compartment I provide wedge members 21 which are the counterpart of wedge members 2 and 11 reversely positioned with respect to and which also function with the corner wedge members of the compartment to center and lock the compartment in its position when placed upon the car.

As shown in the drawing the door of the compartment is preferably corrugated to strengthen it against distortion and the joint between the free end of the door and the end wall of the compartment may be of varied form as shown in the drawings, but of course the joint must be weather and dust proof. The door, 22, is provided with any suitable lock 23 and hinges 24.

The floor, 25, of the compartment is positioned above the lower edges of the walls of the compartment and is secured to the walls of the compartment by means of the channels 26 which function as spacing members and sustain that portion of the walls projecting below the floor level against bending and distortion. This projection of the lower ends of the walls below the floor of the compartment also functions to prevent the floor of the compartment coming in contact with any water that may accumulate in the car or on the platform.

At the top of the compartment there are angle irons extending along each wall of the compartment, one leg of which angle irons is suitably riveted to the walls of the compartment. The roof is preferably a solid steel roof and is composed of the sheets 28 and 29 both of the same construction. The sheets 28 and 29 have the side marginal edges turned upwardly to form upstanding flanges over which are fitted a combined carline and roof seam cap 30 thereby making the joint between the upstanding flanges of adjacent sheet weather and dust proof. These combined carlines and seam caps are flared outwardly at the eaves end thereby providing an extended bearing on the roof at the eaves. The roof sheets and the ends of the combined cap and carline at the eaves are riveted together and to an angle iron 27. It will be seen from the drawing that the eaves end of the combined cap and carline and roof sheets are bent downwardly to form a drip. At the sides of the compartment the roof sheets extend beyond the side walls and are riveted to an angle iron 27 which in turn is riveted to the side walls of the compartment. At regular intervals between the side walls of the compartment I may secure members which function with the seam caps and carlines as compression members to sustain the compartment against buckling or distorting under the load as the compartment is being lifted by a crane.

On diagonal corners of the compartment, or on all four corners of the compartment as may be desired, I secure gusset plates 32 to which are pivotally secured lifting loops 33 with which the chain of the crane may be attached for the purpose of lifting the compartment.

While I have, for the purpose of describing and illustrating my invention, shown a specific form of compartment and arrangement of car to receive the compartments it will be understood that my invention is not limited to such specific constructions but on the contrary is generic to the broad idea of providing a compartment which may be loaded by the shipper, placed upon a car adapted to receive it and removed from said car and delivered to the consignee with the shipment intact, and the loading of a series of such compartments on a car with the doors of such compartments adjacent a wall of another compartment, or an abutment which prevents the opening of the door while the compartment is in position on the car. It is also obvious that the underframe of the car may be of skeleton form.

Of course it is obvious that I may place a running board on the top of the compartments or design the car to have a running board somewhat similar to those on tank cars.

What I claim is:

1. The combination with a car, of a plurality of separate freight compartments detachably mounted therein, and interlocking members on inner face of the walls of the car and compartments respectively, whereby each compartment is independently and rigidly anchored in the car and whereby each compartment may be removed as a unit without impairing the stability of the other compartments or of the car.

2. The combination with a car having side and end walls, friction locking members secured to said walls and ends, and a series of freight compartment units, and friction locking members secured to the walls of said units, whereby when the units are positioned in said car said friction locking members engage with each other to lock the units in the car.

3. The combination with a freight car having side and end walls, of a plurality of freight compartments mounted on said car within said walls cooperating members on the face of the side and end walls of the car and the walls of the compartments to hold the compartments in position on the car.

4. The combination with a car having side and end walls, of a series of independent freight compartments mounted on the car, and locking elements on the walls of the car and the walls of the compartments, to hold the compartments on the car, said locking elements interlocking without manual manipulation as the compartments are positioned on the car.

5. The combination with a car, friction locking members secured to said car, of a series of closed lading holding compartments, and friction locking members on said compartments adapted to interlock with the said locking members on the car when the compartments are positioned in the car whereby the compartments are anchored to the car.

6. A railroad car including an underframe and a plurality of locking members on said underframe, of a plurality of closed independent lading holding compartments having doors, a plurality of locking members on each compartment adapted to interlock with the locking members on the underframe when the compartments are placed on the underframe, each compartment being unattached from the other, and stops to prevent the opening of the doors while the compartments are on the car.

7. An interchangeable less than car load lots lading compartment having friction locking devices on its walls adapted to engage the locking devices on a car.

8. An interchangeable less than car load lots closed lading compartment having a wedge like locking member on its side walls.

9. An interchangeable less than car load lots closed lading compartment having a wedge like locking and centering member on its walls near the bottom thereof, adapted to engage a locking member on a car.

10. A freight and the like compartment comprising four walls, bottom and roof, rigidifying members at the vertical corners of the compartment comprising side marginal edge portions of the walls extending beyond the corners of the compartment and deflected outwardly and a cap covering each corner of the compartment and said marginal edge portions, said cap being secured to the compartment.

11. A freight compartment for receiving less than car load lots, comprising four walls, bottom and roof, rigidifying members at the four corners of the compartment comprising side marginal edge portions of the said walls extending beyond the corners of the compartment and deflected outwardly and substantially parallel, and a cap covering each corner of the compartment and said marginal edge portions and secured to the walls of the compartment.

12. In combination, a plurality of portable containers, a support therefor, a door in each of said containers, and means associated with said support adapted to cause said doors to become automatically locked when the containers are deposited on the support.

13. In combination, a substantially rectangular support, a plurality of containers positioned side by side therein, a door in one of the vertical walls of each container, and a member projecting above the floor of the support for locking the door when the container stands on the support.

14. In combination, a substantially rectangular support, containers positioned side by side and resting on the floor of said support, a door in each of said containers, and means projecting above the floor of the support and abutting some of the walls of the containers for automatically locking the doors when the containers are deposited on the support.

15. In combination, a support, containers positioned side by side thereon, a door in each container, and a member carried by the support and extending above the bottom of each door, whereby each door is locked against surreptitious opening when the container is placed on the support.

16. In combination, a holder, a plurality of containers thereon, a door in each of said containers, and a wall projecting upwardly from the floor of the holder and around the marginal edges thereof, said wall being in close fitting engagement with the containers whereby each door is locked against surreptitious opening, as soon as the container is deposited on the holder.

17. In combination, a substantially rectangular support, a plurality of containers positioned side by side on the floor of said support, a door in each of said containers, and a member extending entirely around the support and projecting upwardly therefrom, the top edges of said member being above the bottom of said doors, whereby the door is locked so long as the container remains on the support.

18. In combination, a substantially rectangular holder, a plurality of containers positioned thereon, each of said containers having at least one door extending vertically of the container, and a wall extending around the holder and projecting vertically above the floor thereof, said wall being in close fitting engagement with at least two walls of the container, whereby the doors are automatically locked when the containers are deposited on the holder.

19. In combination, a rectangular support, a plurality of containers positioned side by side within said support, each container having a door transversely of the support, and means whereby said doors are locked, partially by the wall of an adjacent container, and partially by the support.

20. In combination, a substantially rectangular support, a plurality of containers positioned side by side thereon, each container having a door extending transversely of the support, and means carried by the support and extending upwardly from the floor thereof, said means having a portion thereof above the bottom of said door, whereby the doors are locked as long as the container remains on the support.

21. The combination, with a support, of a plurality of rectangular six-sided containers adapted to rest thereon, each container having vertical walls and a door in one of said walls, and means for holding the containers on the support in such manner that the doors are automatically locked so long as the containers remain in position.

22. The combination, with a support, of a plurality of rectangular six-sided containers adapted to rest thereon, each container having vertical walls and a door in one of said walls, and means for holding the containers on the support, each door being then blocked by means in front thereof preventing its being opened.

ALFRED H. SMITH.